(12) United States Patent
Ortmueller

(10) Patent No.: US 9,994,094 B2
(45) Date of Patent: Jun. 12, 2018

(54) PROFILE ELEMENT FOR CONNECTING A VEHICLE WINDOW PANE TO A COVER PART AND PROFILE ELEMENT ASSEMBLY

(71) Applicant: ELKAMET KUNSTSTOFFTECHNIK GMBH, Biedenkopf (DE)

(72) Inventor: Michael Ortmueller, Dautphetal-Herzhausen (DE)

(73) Assignee: ELKAMET KUNSTSOFFTECHNIK GMBH, Biedenkopf (DE)

( * ) Notice: Subject to any disclaimer, the term of this patent is extended or adjusted under 35 U.S.C. 154(b) by 383 days.

(21) Appl. No.: 14/767,593

(22) PCT Filed: Mar. 6, 2014

(86) PCT No.: PCT/EP2014/054294
§ 371 (c)(1),
(2) Date: Aug. 13, 2015

(87) PCT Pub. No.: WO2014/146902
PCT Pub. Date: Sep. 25, 2014

(65) Prior Publication Data
US 2016/0001645 A1  Jan. 7, 2016

(30) Foreign Application Priority Data

Mar. 19, 2013 (DE) .................. 10 2013 204 820

(51) Int. Cl.
*B60J 10/70* (2016.01)
*B62D 65/08* (2006.01)
(Continued)

(52) U.S. Cl.
CPC .......... *B60J 10/0088* (2013.01); *B60J 10/18* (2016.02); *B60J 10/20* (2016.02); *B60J 10/34* (2016.02); *B60J 10/45* (2016.02); *B60J 10/70* (2016.02)

(58) Field of Classification Search
CPC ... B60J 10/00; B60J 10/02; B60J 10/18; B60J 10/20; B60J 10/265; B60J 10/30; B60J 10/34; B60J 10/45; B60J 10/70
See application file for complete search history.

(56) References Cited

U.S. PATENT DOCUMENTS

| | | | | |
|---|---|---|---|---|
| 4,968,543 A | * | 11/1990 | Fujioka | .................. B60J 1/2002 296/93 |
| 5,603,546 A | * | 2/1997 | Desir, Sr. | ................. B60J 10/45 296/146.15 |

(Continued)

FOREIGN PATENT DOCUMENTS

| | | |
|---|---|---|
| DE | 202008009712 U1 | 11/2008 |
| DE | 202008006986 U1 | 10/2009 |
| WO | WO 2012089309 A1 | 7/2012 |

*Primary Examiner* — Daniel J Wiley
(74) *Attorney, Agent, or Firm* — Leydig, Voit & Mayer, Ltd.

(57) ABSTRACT

A profile element for connecting a vehicle window pane to a cover part includes a first connecting area for connecting the profile element to the vehicle window pane and a second connecting area for connecting the profile element to the cover part. A sealing element has at least a first segment and a second segment that are moveable relative to each other. The first segment has a first sealing surface configured to be placed against the vehicle window pane and the second segment has a second sealing surface configured to be placed against the cover part such that the sealing element forms a seal between the vehicle window pane and the cover part.

19 Claims, 11 Drawing Sheets

(51) Int. Cl.
*B60J 10/18* (2016.01)
*B60J 10/20* (2016.01)
*B60J 10/34* (2016.01)
*B60J 10/00* (2016.01)

(56) References Cited

U.S. PATENT DOCUMENTS

| | | | | |
|---|---|---|---|---|
| 6,769,700 | B2* | 8/2004 | Ortmuller | B60J 10/18 |
| | | | | 277/642 |
| 7,073,842 | B2* | 7/2006 | Kagawa | B60J 10/70 |
| | | | | 296/146.15 |
| 8,251,432 | B2* | 8/2012 | Schaff | B60J 10/18 |
| | | | | 296/93 |
| 8,393,668 | B2* | 3/2013 | Timmermann | B60J 10/35 |
| | | | | 296/84.1 |
| 8,444,205 | B2* | 5/2013 | Flammer | B60J 10/265 |
| | | | | 296/201 |
| 8,449,016 | B2* | 5/2013 | Timmermann | B60J 10/30 |
| | | | | 277/921 |
| 8,628,137 | B2* | 1/2014 | Platt | B60J 10/02 |
| | | | | 296/84.1 |
| 8,991,893 | B2 | 3/2015 | Platt et al. | |
| 9,006,613 | B2* | 4/2015 | Sakamoto | B60J 1/02 |
| | | | | 219/203 |
| 9,073,421 | B2* | 7/2015 | Deussen | B60J 10/18 |
| 9,126,635 | B2* | 9/2015 | Sano | B62D 25/081 |
| 9,168,879 | B2* | 10/2015 | Timmermann | B60J 1/02 |
| 9,259,994 | B2* | 2/2016 | Erner | B60J 1/02 |
| 9,586,465 | B2* | 3/2017 | Sanada | B60J 10/30 |
| 2010/0320797 | A1* | 12/2010 | Schlater | B60J 10/70 |
| | | | | 296/93 |
| 2017/0028832 | A1* | 2/2017 | Sekishiro | B60J 10/70 |
| 2017/0267084 | A1* | 9/2017 | Schoch | B60J 10/70 |

* cited by examiner

Fig. 1

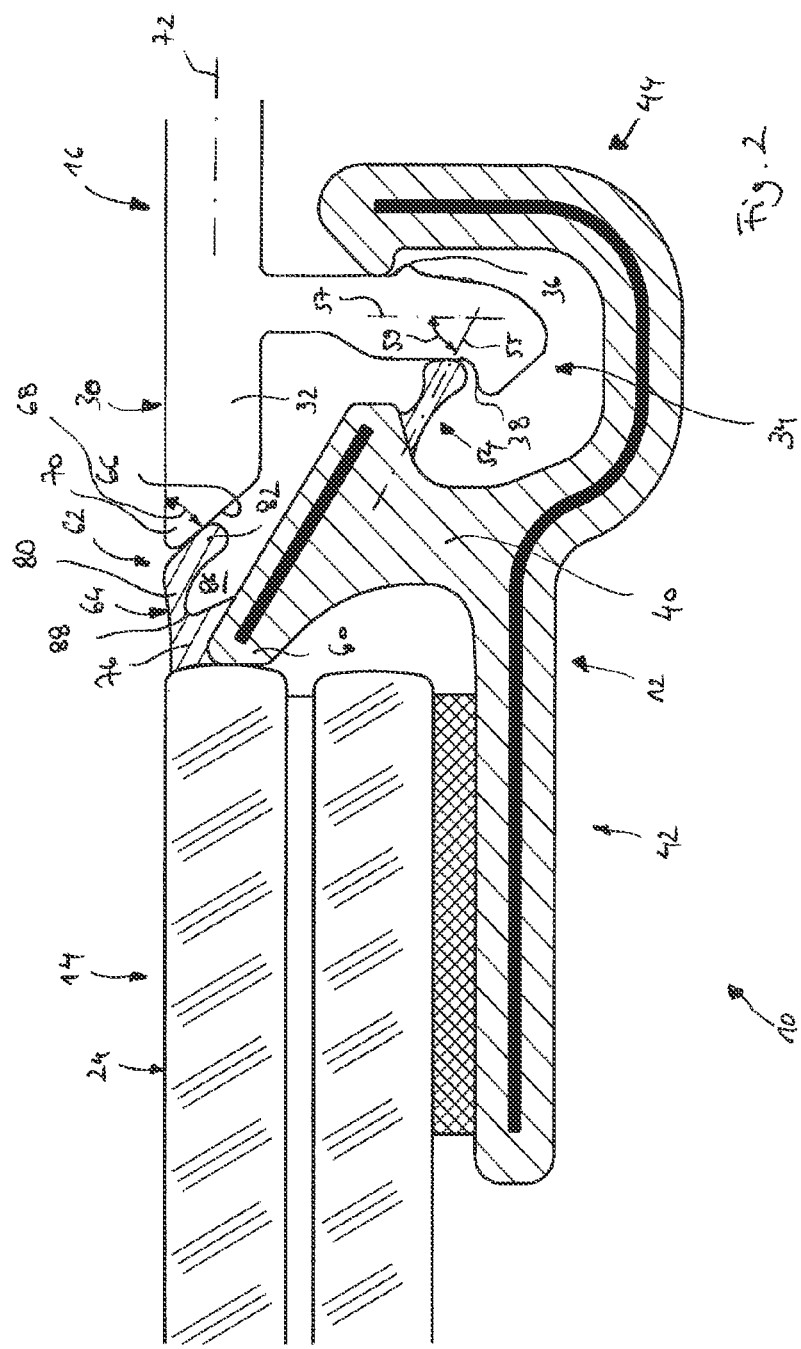

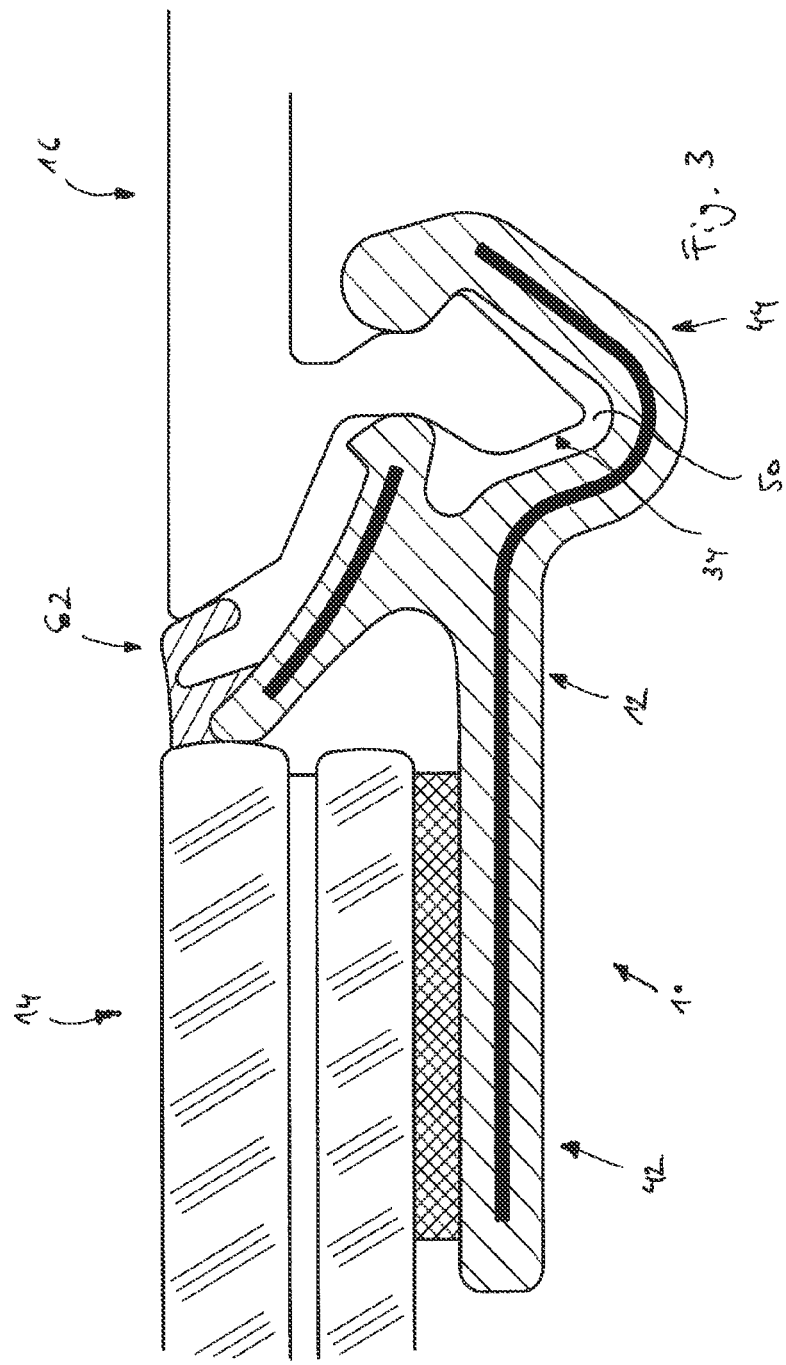

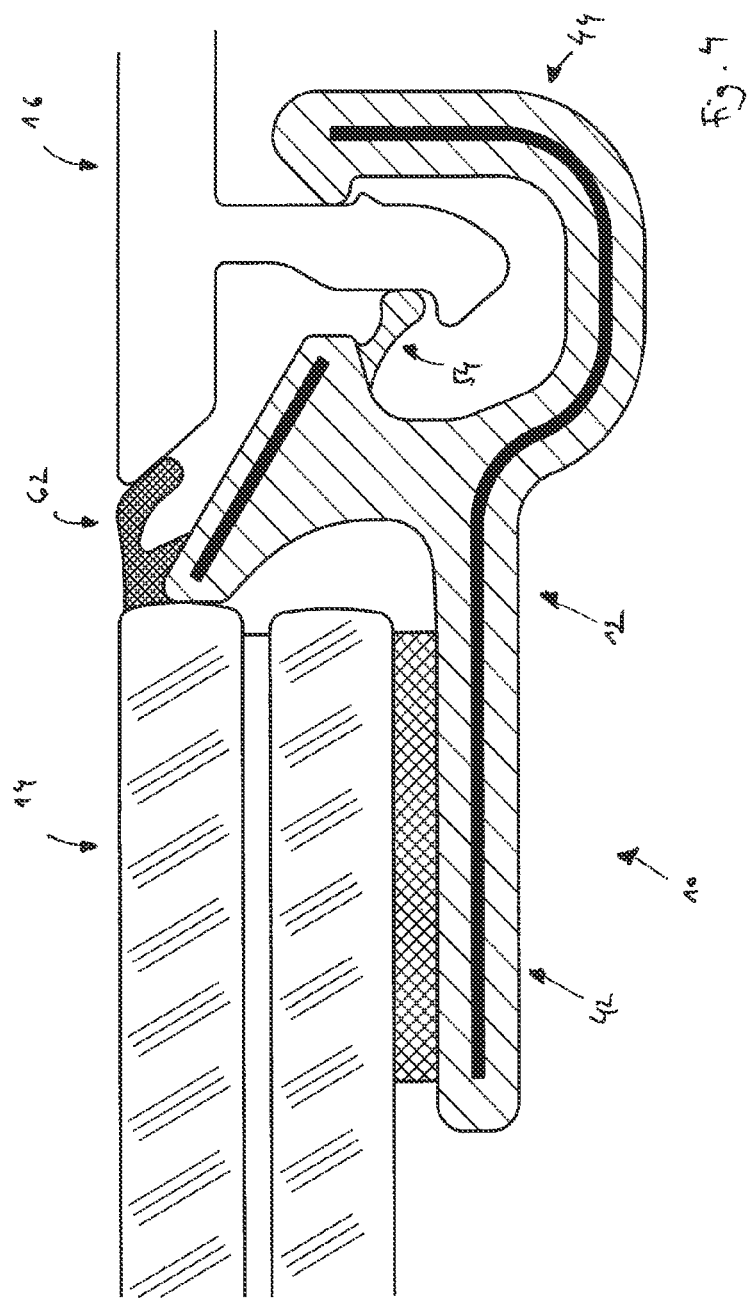

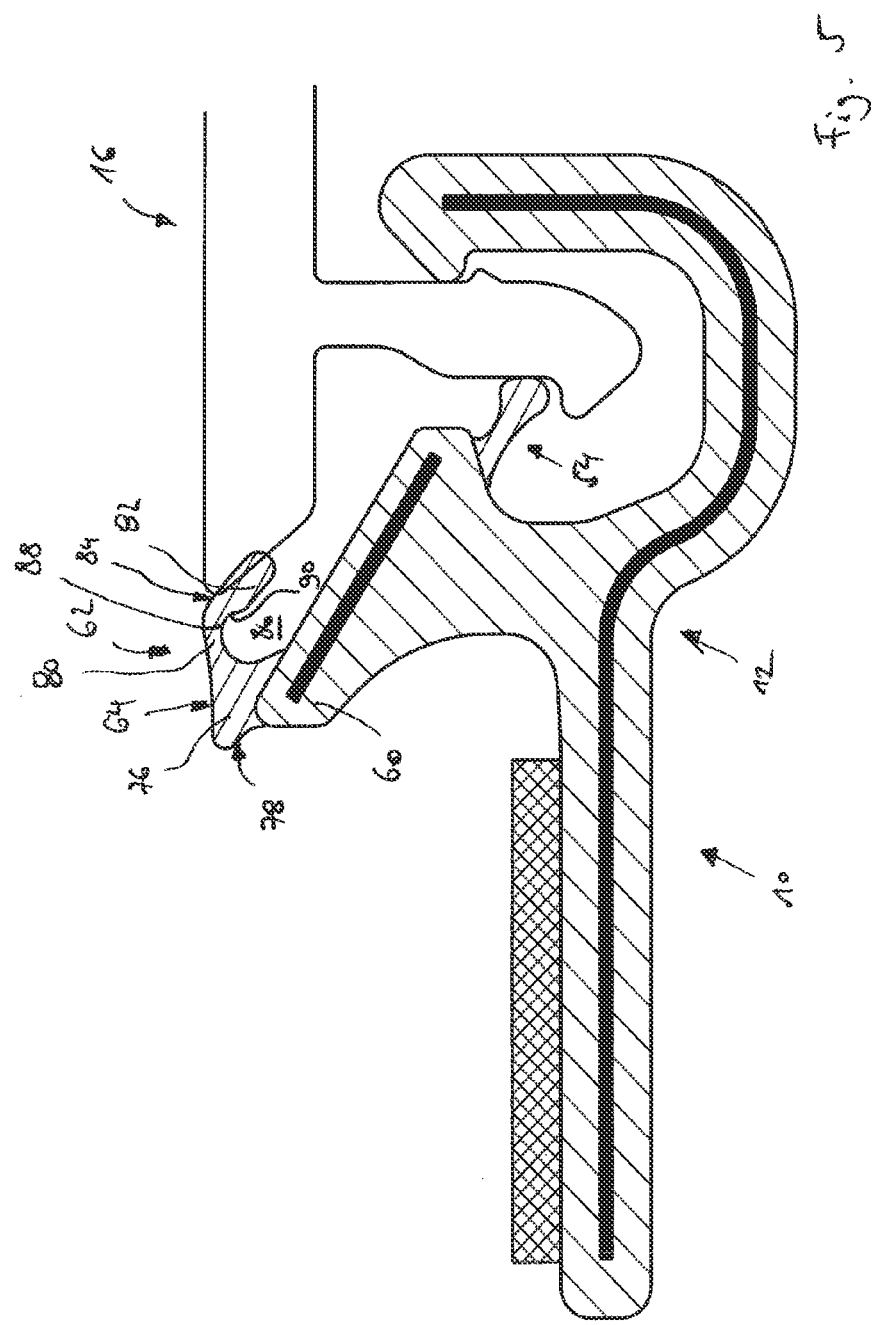

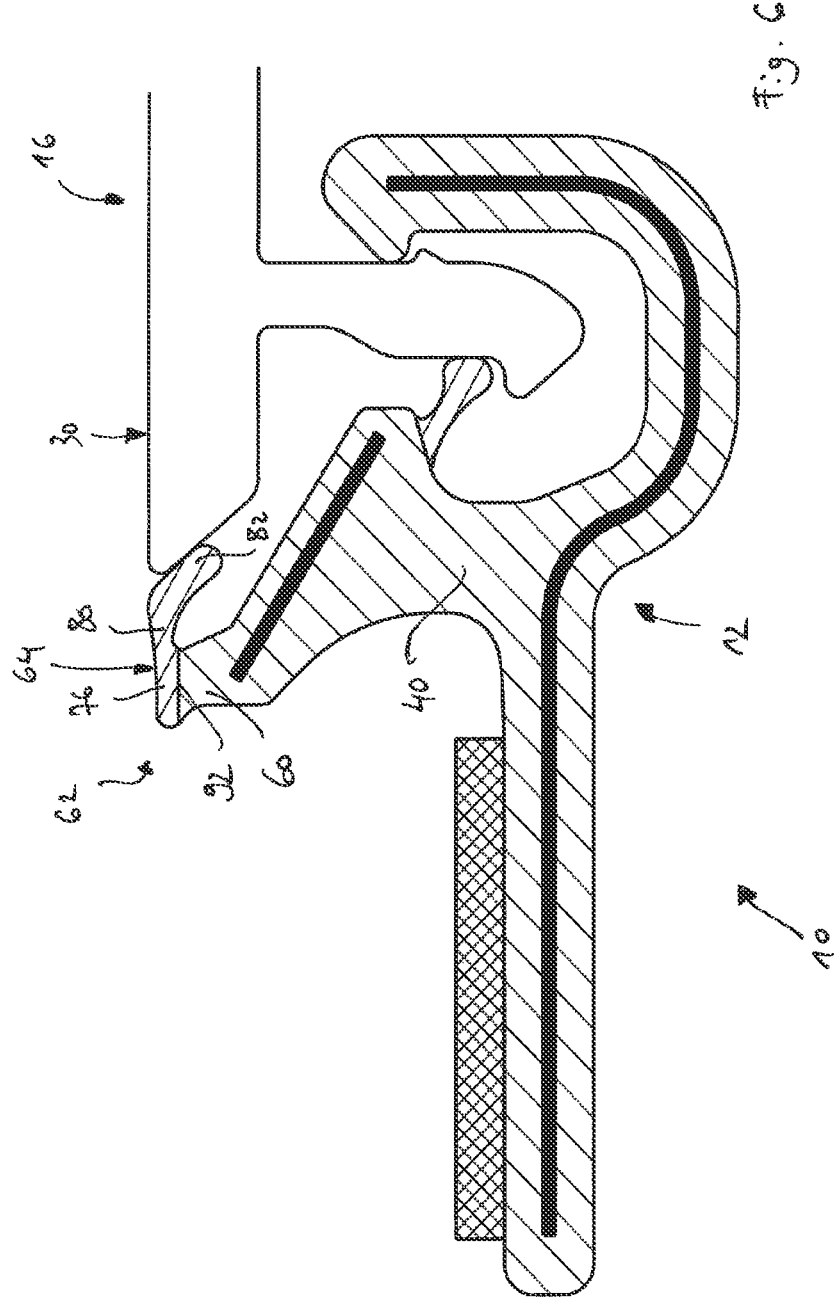

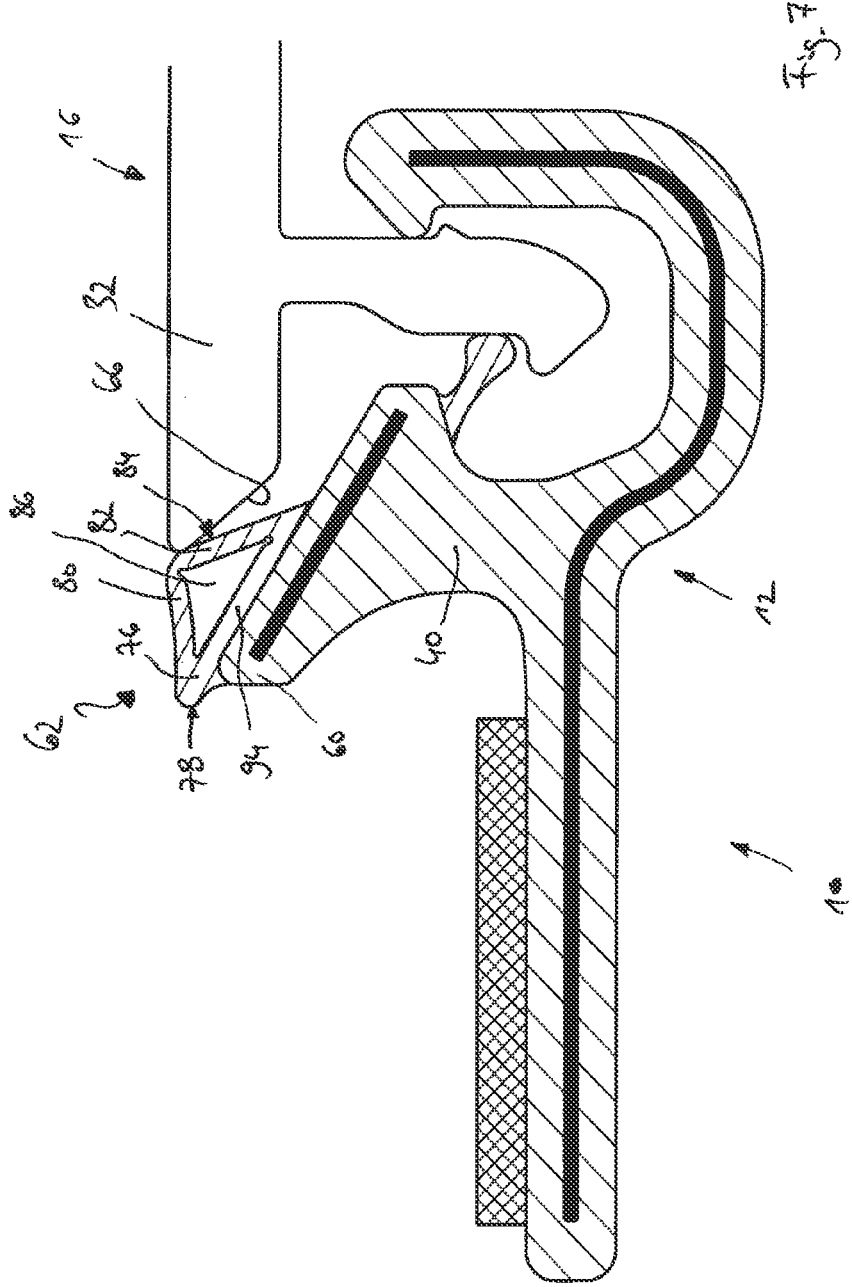

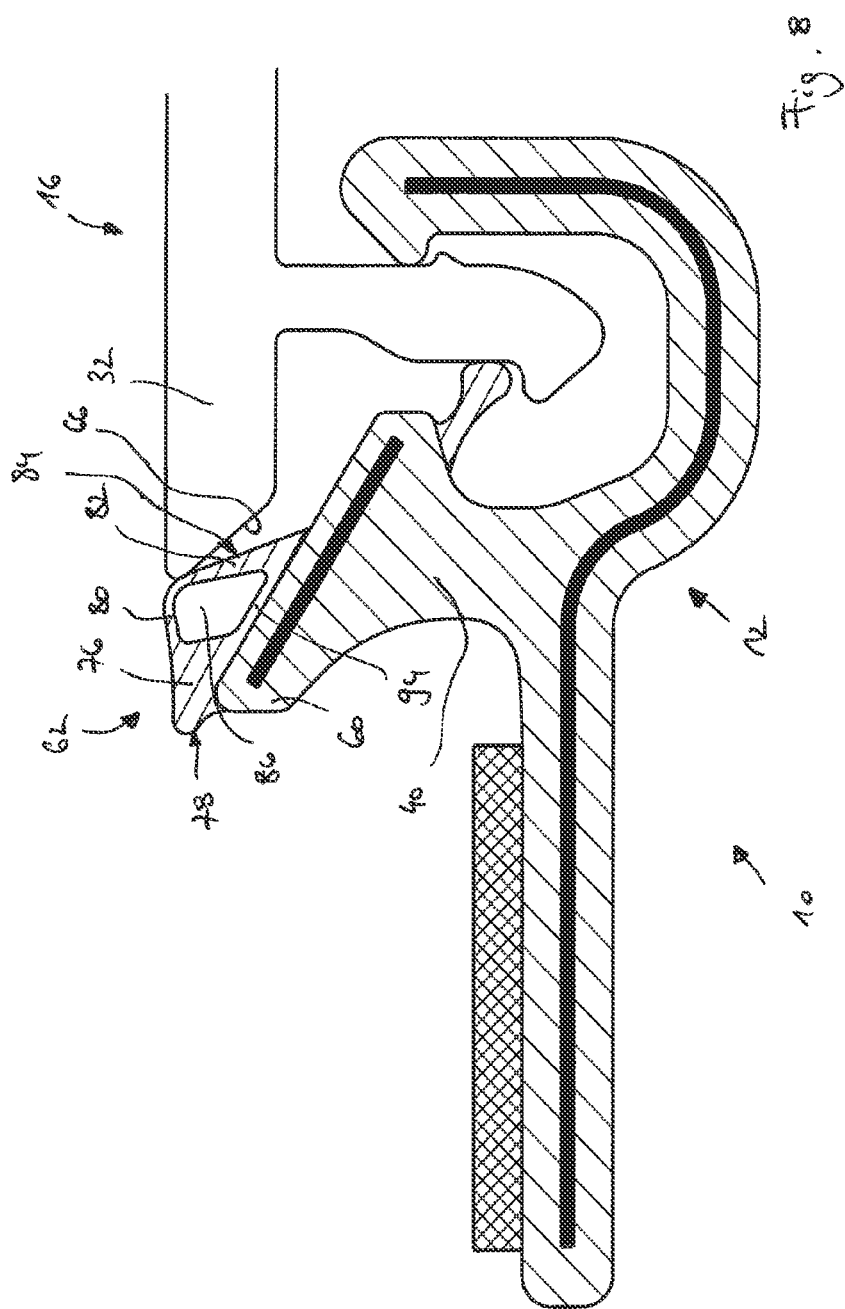

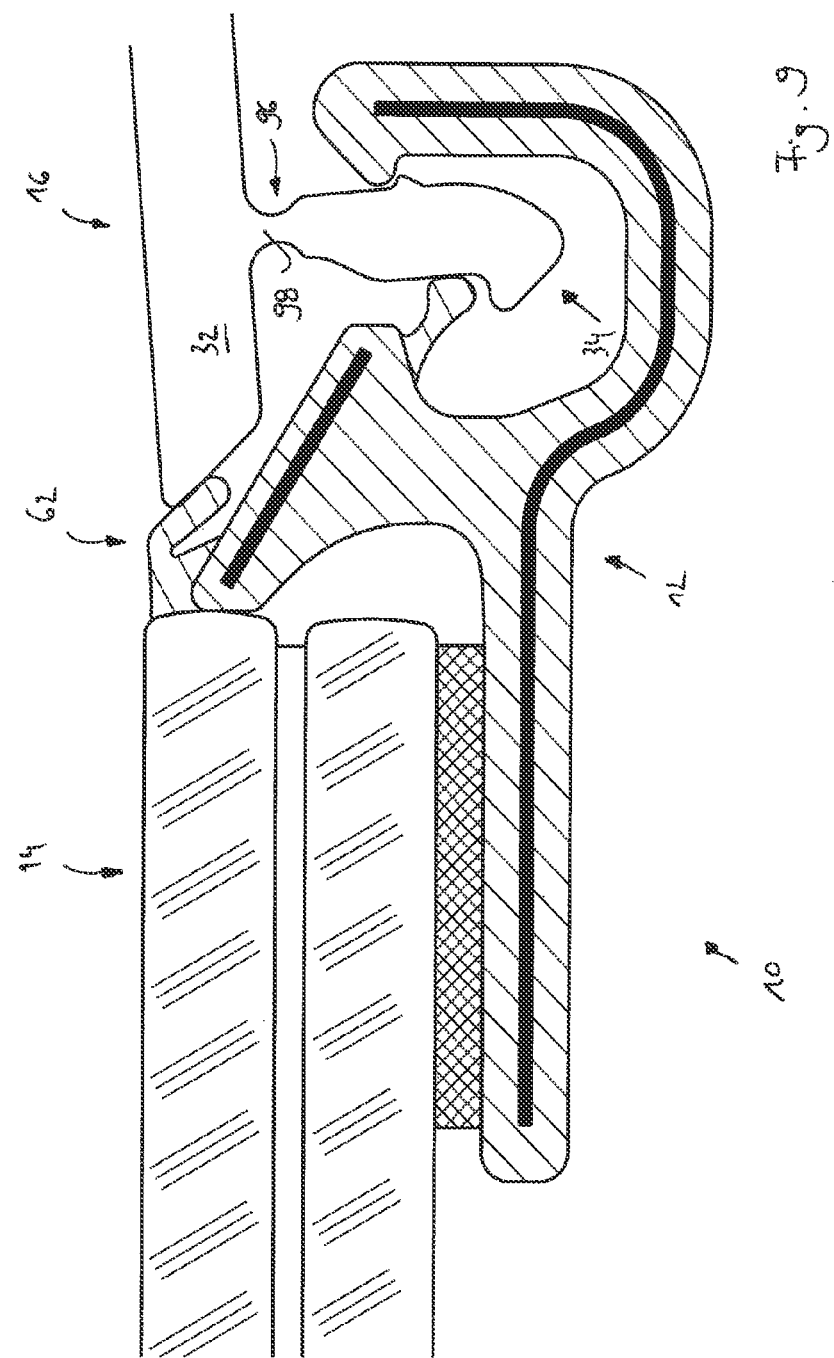

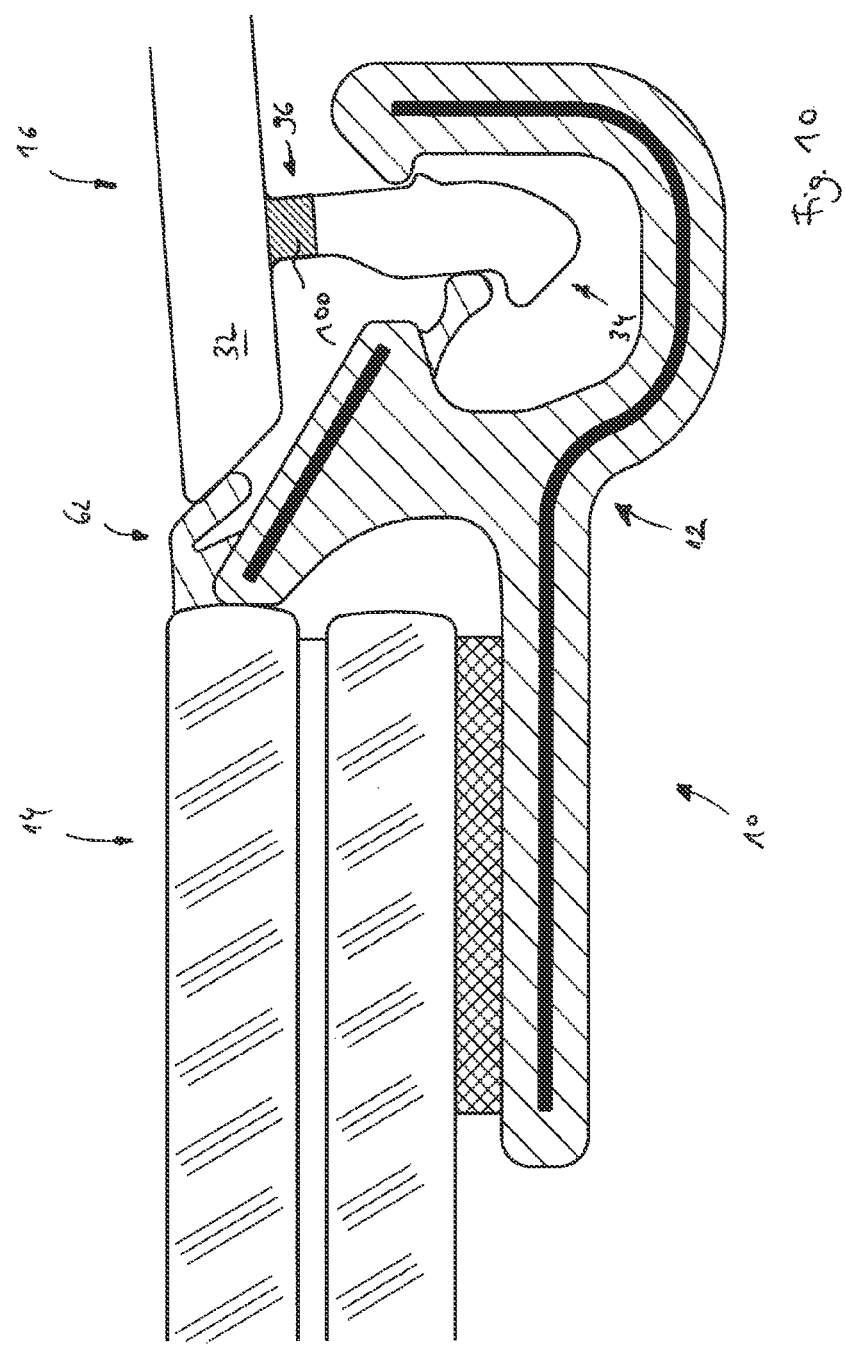

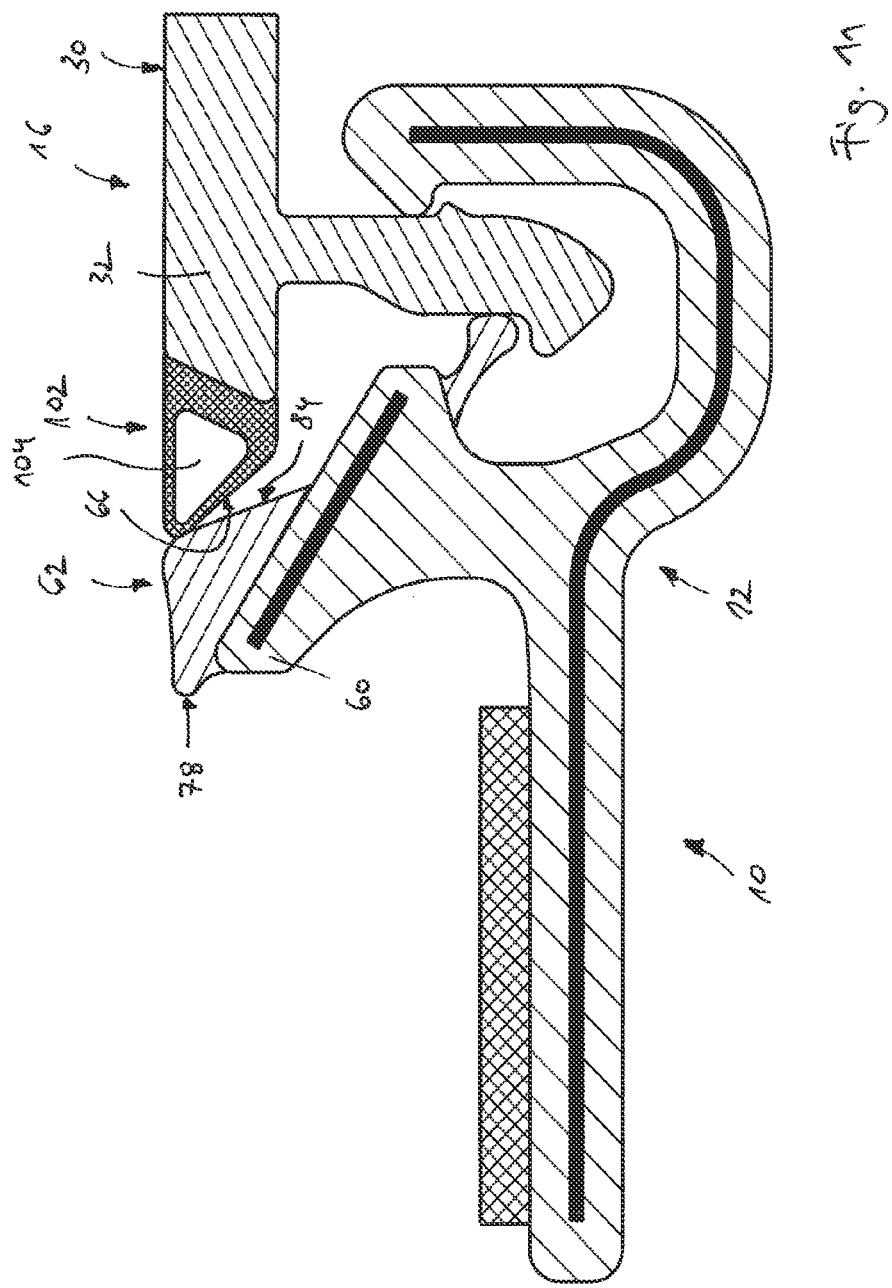

US 9,994,094 B2

PROFILE ELEMENT FOR CONNECTING A VEHICLE WINDOW PANE TO A COVER PART AND PROFILE ELEMENT ASSEMBLY

CROSS-REFERENCE TO PRIOR APPLICATIONS

This application is a U.S. National Stage application under 35 U.S.C. § 371 of International Application No. PCT/EP2014/054294 filed on Mar. 6, 2014, and claims benefit to German Patent Application Nos. DE 10 2013 204 820.3 filed on Mar. 19, 2013. The International application was published in German on Sep. 25, 2014 as WO 2014/146902 A1 under PCT Article 21(2).

FIELD

The invention relates to a profile element for connecting a vehicle window pane to a cover part, comprising a first connecting area for connecting the profile element to the vehicle window pane, a second connecting area for connecting the profile element to the cover part, and a sealing element for placement against the vehicle window pane and against the cover part.

BACKGROUND

A profile element disclosed in German utility model DE 20 2008 006 986 U1 is first connected to a vehicle window pane before the vehicle window pane with the connected profile element is mounted on a vehicle. Subsequently, a cover part is mounted which can be, for example, a water trough cover that is latched to the profile element. A water trough cover serves to cover a water trough that collects water that runs off the vehicle window pane and to drain it to the outside. The water trough can be part of the car body.

The water trough cover is normally latched to the profile element over the entire profile length. Therefore, in order to latch the water trough cover, the water trough cover has to be aligned quite precisely relative to the profile element during the mounting. For reasons having to do with installation space, this is not always possible, for example, if aggregates in the engine compartment are in the way of the water trough cover and thus prevent an optimal alignment. As a result, the worker will tend to exert greater installation forces so as to be able to mount the water trough cover especially from a non-optimal position and/or alignment.

SUMMARY

In an embodiment, the present invention provides a profile element for connecting a vehicle window pane to a cover part. The profile element includes a first connecting area for connecting the profile element to the vehicle window pane and a second connecting area for connecting the profile element to the cover part. A sealing element has at least a first segment and a second segment that are moveable relative to each other. The first segment has a first sealing surface configured to be placed against the vehicle window pane and the second segment has a second sealing surface configured to be placed against the cover part such that the sealing element forms a seal between the vehicle window pane and the cover part.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 a side view of an embodiment of a profile element assembly, in a state in which it is being mounted;

FIG. 2 a side view of the profile element assembly according to FIG. 1, in a fully mounted state;

FIG. 3 a side view of another embodiment of a profile element assembly;

FIG. 4 a side view of another embodiment of a profile element assembly with a sealing element made of microcellular rubber;

FIG. 5 a side view of another embodiment of a part of a profile element assembly with a sealing element that has a free space with an undercut;

FIG. 6 a side view of another embodiment of a part of a profile element assembly with a sealing element with a flat cross section;

FIGS. 7 and 8 side views of additional embodiments of a part of a profile element assembly with a sealing element that has a free space with a cavity that is closed along the circumference; and FIGS. 9 to 11 side views of additional embodiments of a profile element assembly or of a part of a profile element assembly with a cover part that has been modified in order to simplify the mounting.

DETAILED DESCRIPTION

The inventor has found that greater installation forces can destroy the profile element and/or can cause the profile element to become detached from the vehicle window pane, especially if the profile element is not supported from below by a beam on the car body.

In an embodiment, the present invention provides a profile element that simplifies the mounting of the cover part on the profile element.

An embodiment of the invention provides that the sealing element has at least two segments that can move relative to each other, whereby a first segment has a first sealing surface for placement against the vehicle window pane, and a second segment has a second sealing surface for placement against the cover part.

According to an embodiment of the invention, the sealing element has two segments that are separate from each other and that can move relative to each other. The relative mobility of the segments permits at least one segment of the sealing element to deflect during the mounting of the cover part (especially of the water trough cover), so that cover segments that interfere with a sealing area or the sealing element during the mounting can be freely positioned. Thus, additional movement space is provided for the cover part in that the segments of the sealing element can move relative to each other.

The relative mobility of the segments entails the advantage that, even when the cover part is being installed in an unfavorable position, the necessary installation forces can be reduced and, at the same time, the risk of damage or destruction of the profile element is diminished. These advantages arise especially if, within the scope of the mounting of a cover part, the area of the cover part that is intended for placement against the second sealing surface of the profile element comes to rest on the sealing element of the profile element due to a non-optimal alignment of the cover part, namely, before the profile element and the cover part have latched to each other via appropriate latching members.

If, as mentioned above, a worker applies greater installation forces in order to force the mounting, for instance, of a water trough cover from a non-optimal position, this can cause the profile element to be deformed away from its normal orientation and to tilt around the lengthwise direction of the profile element. This increases the relative misalignment of the profile element and of the water trough cover, thereby further hindering or even altogether preventing the latching members from latching. Within the scope of embodiments of the invention, it is now possible to latch a water trough cover to the profile element in spite of such a misalignment and, at the same time, to avoid an associated increase in the necessary mounting forces and to prevent the resultant worsening of the relative misalignment of the profile element and of the water trough cover.

In order to attain a particularly simply structured sealing element, it is preferable if the segments are produced in one piece with each other.

It is also preferable if the segments are connected to each other by means of a connecting section that has a tapered cross section. This allows the segments to pivot relative to each other around the tapered connecting section.

Moreover, it is preferable if the sealing element has a free space into which at least one of the segments can be deformed. In this manner, the forces needed for a relative movement of the segments during the mounting of the cover part can be reduced.

The free space is, for example, delimited by a groove that is open along the circumference, thereby permitting a relatively simple production of the profile element.

It is also possible for the free space to be delimited by a cavity that is closed along the circumference, making it possible to provide a sealing element that can be deformed but that is nevertheless sturdy.

Preferably, the sealing element is made of at least one resilient material, so that, by means of the application of force from the outside, the segments can be moved relative to each other from a relaxed initial state into an intermediate state, and so that, from the intermediate state, they can autonomously be restored back to their initial state due to the effect of the restoring forces of the resilient material. The restoring forces of the resilient material assist in the contact of the sealing surfaces, especially of the second sealing surface against a counter-surface of the cover part, so as to create a seal.

Preferred materials for the sealing element are elastomers, thermoplastic elastomers, foamed thermoplastic elastomers and microcellular rubber.

The sealing element according to an embodiment of the invention is especially well-suited for profile elements in which the second connecting area has a latching area to accommodate a latching member of the cover part, whereby, within the latching area, there is a latching element that serves to latch the latching member in the latching area, whereby the latching element extends along a latching element plane that is oriented at an acute angle relative to an insertion plane for inserting the latching member into the latching area, so that the latching element forms a barb. The barb-shaped latching element is only slightly deformed (i.e. pushed or bent to the side) when the latching member is inserted into the latching area (that is to say, during the mounting of the cover part). When the latching member is removed from the latching area (that is to say, when the cover part is being dismantled), the barb-shaped latching element is compressed and thus deformed to a greater extent than during the mounting of the cover part. Such latching is known, for example, from German utility model DE 20 2008 006 986 U1 of the same applicant. The entire disclosure in this publication regarding the structure and mode of operation of the profile element is hereby incorporated herein by reference.

It is also preferable if the sealing element has an outer surface that, when the profile element is in the mounted state, is arranged so as to be flush or at least essentially flush with the outside of the vehicle window pane and with the outside of the cover part, so that it can create an altogether, at least largely, continuous outer surface on the vehicle. Therefore, it is preferable to arrange the segments on the side of the sealing element facing away from the outer surface.

Embodiments of the invention also relate to a profile element assembly that comprises a profile element as described above that is connected to a vehicle window pane by means of the first connecting area, whereby the first sealing surface of the first segment of the sealing element is in contact with an end face of the vehicle window pane and whereby the second segment of the sealing element can move relative to the first segment.

Figure 1:
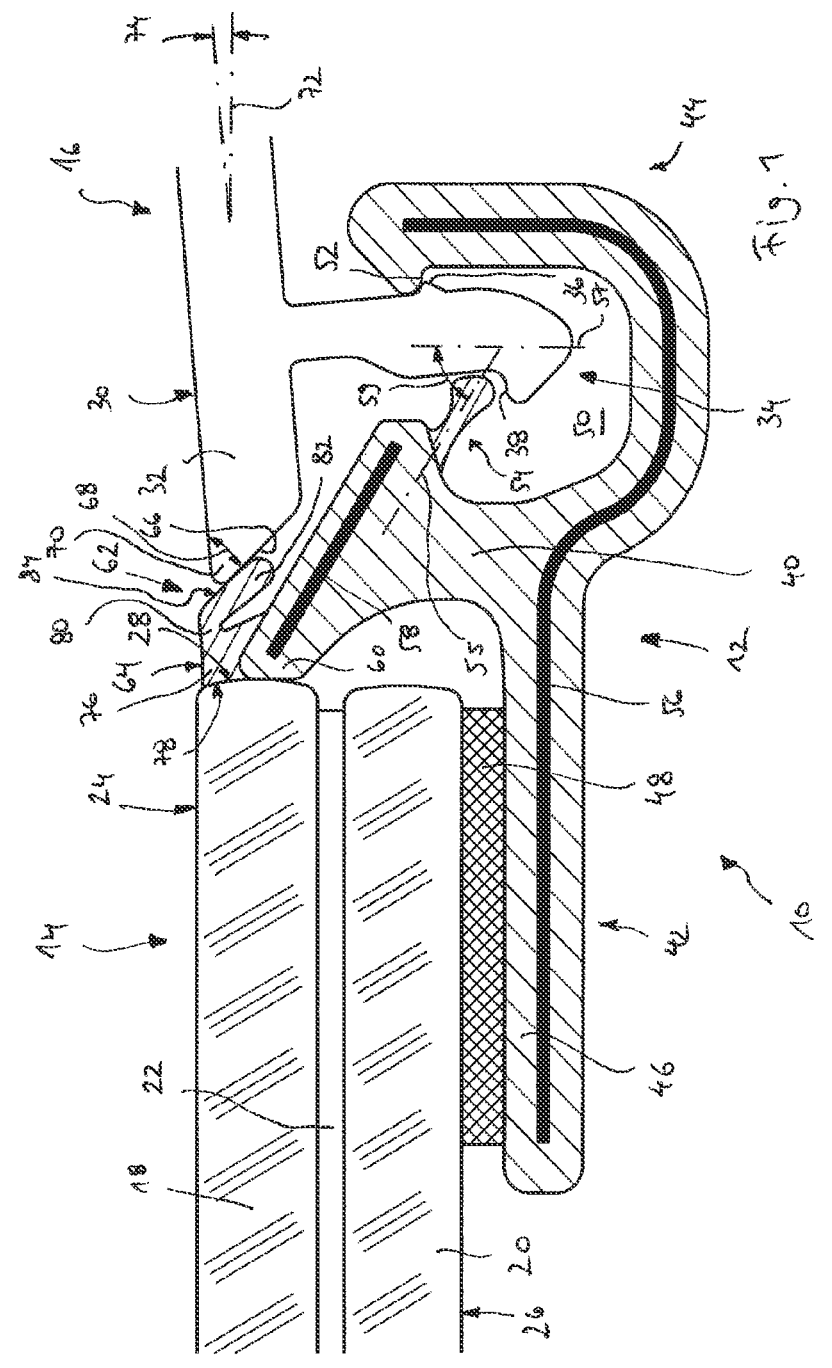

An embodiment of a profile element assembly is designated in its entirety with the reference numeral 10 in FIG. 1. The assembly 10 comprises a profile element 12 as well as a vehicle window pane 14 (especially the windshield of a motor vehicle) of which only a section is shown and a cover part 16 of which only a section is shown and that is configured especially as a water trough cover. Therefore, the cover part 16 will be referred to below as the water trough cover 16.

The vehicle window pane 14 is advantageously a composite construction with window pane layers 18 and 20 that are parallel and connected to each other by means of a connecting layer 22. The vehicle window pane 14 has an outside 24, an inside 26, and an end face 28 extending along the rim of the vehicle window pane 14 between the outside 24 and the inside 26.

The water trough cover 16 has an outside 30 that, when the water trough cover 16 is in the mounted state (see FIG. 2), is arranged at least essentially at the same height as the outside 24 of the vehicle window pane 14. The outside 30 is made up of a water trough section 32 which can be a so-called cowl top cover or an air inlet panel.

When the water trough cover 16 is in the fully mounted state, the water trough section 32 and the vehicle window pane 14 are arranged so as to be essentially flush with each other. Projecting from the water trough section 32 is a latching member 34 that is especially configured in the form of a latching arm. The latching member 34 preferably extends along the entire length of the water trough cover 16 (in other words essentially over the width of the vehicle window pane 14 when the water trough cover 16 is in the mounted state on the motor vehicle, i.e. in the crosswise direction of the vehicle).

The latching member 34 has a first latching surface 36 and a second latching surface 38. The latching surfaces 36 and 38 are arranged on sides of the latching member 34 facing away from each other.

The profile element 12 has a main member 40 from which a first connecting area 42 for connecting the profile element 12 to the vehicle window pane 14 extends, and a second connecting area 44 for connecting the profile element 12 to the water trough cover 16.

The first connecting area 42 comprises, for example, a support section 46 that is parallel to the vehicle window pane 14 and that serves to support an adhesive layer 48 for adhesively joining the support section 46 to the bottom 26 of the vehicle window pane 14.

The second connecting area 44 comprises a latching area 50 that preferably has an essentially U-shaped, L-shaped or hook-shaped cross section and that serves to accommodate the latching member 34 of the water trough cover 16.

The second connecting area 44 has a latching edge 52 that cooperates with the first latching surface 36 of the latching member 34 of the water trough cover 16.

A latching element 54 is arranged in the latching area 50 on the side opposite from the latching edge 52, and this latching element 54 cooperates with the second latching surface 38 of the latching member 34 of the water trough cover 16. Regarding the structure and mode of operation of the latching element 54, reference is hereby also made to the content of German utility model DE 20 2008 006 986 U1 of the same applicant. The latching element 54 extends along a latching element plane 55 that is oriented at an acute angle 59 relative to an insertion plane 57 of the latching member 34 of the water trough cover 16. The angle 59 is preferably between approximately 20° and approximately 70°, especially between approximately 30° and approximately 60°.

The profile element 12 is preferably made of an elastic material that is mechanically reinforced by means of metal inserts 56, 58, that are made, for instance, of aluminum.

The profile element 12 also comprises a support section 60 that extends from the main member 40 and that serves to support a sealing element 62. The sealing element 62 has an outer surface 64 that, when the water trough cover 16 is in the mounted state (see FIG. 2), runs at least essentially parallel to and flush with the outside 24 of the vehicle window pane 14 and with the outside 30 of the water trough cover 16.

The sealing element 62 extends between the end face 28 of the vehicle window pane 14 and a counter-surface 66 of the water trough cover 16. The counter-surface 66 is formed by an end face of the water trough section 32. Preferably, the counter-surface 66 is slanted relative to a direction that is perpendicular to the outside 30 of the water trough section, so that the counter-surface 66 and the outside 30 enclose between them an angle 68 of approximately 10° to 85°, preferably approximately 30° to approximately 70°, especially approximately 40° to approximately 60°. The counter-surface 66 and the outside 30 merge together at a mounting edge 70.

When the water trough section 32 is oriented so as to be slanted towards the outside by an angle of inclination 74 relative to a position 72 that is parallel to the vehicle window pane 14, the insertion of the latching member 34 of the water trough cover 16 into the latching area 50 of the profile element 12 causes interference between the mounting edge 70 and the sealing element 62.

The sealing element 62 has a first segment 76 with a first sealing surface 78 that is in contact with the end face 28 of the vehicle window pane 14 so as to create a seal.

The first segment 76 is connected to a second segment 82 by means of a connecting section 80 that has a tapered cross section, and the second segment 82 has a second sealing surface 84 that is in contact with the counter-surface 66 of the water trough cover 16 so as to create a seal. The second segment 82 can pivot around the connecting section 80 relative to the first segment 76.

In FIG. 1, the second segment 82 is shown in a state in which it has been deformed by having been pressed by the mounting edge 70, and in this state, the second segment enters a free space 86 (see FIG. 2) formed between the segments 76 and 82.

In the embodiment shown in FIGS. 1 and 2, the free space 86 is delimited by a groove 88 that is open along the circumference.

The sealing element 62 is made of a resilient material, for example, of a thermoplastic elastomer. After the latching member 34 of the water trough cover 16 has latched completely to the latching edge 52 as well as to the latching element 54, the restoring forces of the resilient material of the sealing element 62 bring about a return of the second segment 82 out of the free space 86 in the direction of the counter-surface 66, so that the second sealing surface 84 and the counter-surface 66 of the water trough cover 16 come into contact with each other so as to create a seal.

The advantageous effects of the sealing element 62 according to the invention arise especially in case of a second connecting area 44 with a latching area 50 that has a latching element 54 as described above with reference to FIGS. 1 and 2. The advantages of the sealing element 62 also arise when the second connecting area 44 does not have a latching element 54, as is shown in FIG. 3 by way of an example.

The main member 40 with the connecting areas 42 and 44 of the profile element 12 as well as the support section 60 for the sealing element 62 are preferably made of the same material, for example, of a blend of acrylonitrile-butadiene-styrene copolymer and polyvinyl chloride (ABS/PVC) or of polypropylene (PP) or other thermoplastically processable plastics. The sealing element 62 and a latching element 54 that is optionally present can be made of another material, for instance, a thermoplastic elastomer (TPE). The sealing element 62 and the optionally present latching element 54 are preferably produced together with the main member 40, with the connecting areas 42 and 44, and with the support section 60 by means of a (co)extrusion process.

The sealing element 62 and the optionally present latching element 54 can be made of a thermoplastic elastomer. It is also conceivable to make the sealing element 62 out of a microcellular rubber material or of a foamed TPE that is particularly soft and very easily deformable. Such a sealing element 62 is shown in FIG. 4.

Examples of different geometries of the sealing element 62 are described below. A sealing element 62 shown in FIG. 5 has a structure that is similar to the sealing element 62 according to FIGS. 1 to 4. However, the free space 86 of the sealing element 62 is delimited by a groove 88 that is open along the circumference and that has an undercut 90. In this manner, a particularly good mobility of the second segment 82 relative to the first segment 76 is achieved around the connecting section 80.

A sealing element 62 shown in FIG. 6 has a flattened first segment 76 that extends essentially parallel to the outer surface 64 of the sealing element 62. Facing the support section 60, the first segment 76 has a delimitation line 92 that runs essentially parallel to the outside 30 of the water trough cover 16 when the latter is in its fully mounted state on the profile element 12. This has the advantage that a pressure load exerted on the first segment 76 can be very easily dissipated via the delimitation line 92 onto the support section 60 of the main member 40 of the profile element 12.

In the embodiments shown in FIGS. 7 and 8, there are sealing elements 62 having free spaces 86 that are delimited by a cavity that is closed along the circumference.

The connection between the first segment 76 and the second segment 82 on the side opposite from the connecting section 80 is established by means of an additional section 94 that permits a connection to the support section 60 of the main member 40 over a large surface area.

It is possible for the boundaries of the cavity and the outer surfaces of the sealing element 62 to run at least essentially parallel to each other (see FIG. 7). It is also possible for the course of the boundaries and the course of the outer surfaces of the sealing element 62 to be independent of each other (see FIG. 8).

The profile element assemblies 10 described below with reference to FIGS. 9 and 10 are identical to the profile element assemblies 10 according to FIGS. 1 and 2 as far as the profile element 12 and the vehicle window pane 14 are concerned. The special feature of the profile element assembly 10 according to FIGS. 9 and 10 lies in the fact that the latching member 34 of the water trough cover 32 is not connected rigidly to the water trough section 32 in a connecting area 96, but rather by means of a tapered connecting section 98 (see FIG. 9) or by means of an elastic connecting section 100 (see FIG. 10).

A profile element assembly 10 shown in FIG. 11 comprises a sealing element 62 with a closed cross section without segments that are separate from each other, without a connecting section for connecting the segments, and without a free space into which at least one of the segments can be shaped. This sealing element 62 has a second sealing surface 84 to make contact with a counter-surface 66 of the water trough cover 16. The counter-surface 66 is formed by an elastically deformable additional section 102 of the water trough section 32. The additional section 102 is especially made of a resilient material and comprises, for example, a deformation space 104.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A profile element for connecting a vehicle window pane to a cover part, the profile element comprising:
    a first connecting area for connecting the profile element to the vehicle window pane;
    a second connecting area for connecting the profile element to the cover part; and
    a sealing element having at least a first segment and a second segment that are moveable relative to each other, the first segment having a first sealing surface configured to be placed against the vehicle window pane and the second segment having a second sealing surface configured to be placed against the cover part such that the sealing element forms a seal between the vehicle window pane and the cover part,
    wherein the sealing element has a free space into which at least one of the segments is deformable, and
    wherein the free space is delimited by a groove that is open away from an outer surface of the sealing element.

2. The profile element according to claim 1, wherein the segments are produced in one piece with each other.

3. The profile element according to claim 1, wherein the segments are connected to each other by a connecting section that has a tapered cross section.

4. The profile element according to claim 1, wherein the sealing element is made of at least one resilient material, so that, by means of an application of an external force, the segments are moved relative to each other from a relaxed initial state into an intermediate state, and so that, from the intermediate state, the segments are autonomously restored back in a direction of their initial state due to restoring forces of the resilient material.

5. The profile element according to claim 1, wherein the second connecting area has a latching area that accommodates a latching member of the cover part, and wherein, within the latching area, a latching element is disposed and configured to latch the latching member in the latching area, the latching element extending along a latching element plane that is oriented at an acute angle relative to an insertion plane for inserting the latching member into the latching area, so that the latching element forms a barb.

6. The profile element according to claim 1, wherein the sealing element has an outer surface that, in a mounted state of the profile element, is arranged so as to be essentially flush with an outside of the vehicle window pane and with an outside of the cover part.

7. The profile element according to claim 6, wherein the segments are arranged on a side of the sealing element facing away from an outer surface of the sealing element.

8. The profile element according to claim 1, wherein the second segment of the sealing element is connected at a first end to the first segment and has a free end opposite the first end, an opening into the free space being located at the free end.

9. A profile element assembly, comprising:
    a profile element comprising:
        a first connecting area connected to a vehicle window pane;
        a second connecting area for connecting the profile element to a cover part; and
        a sealing element having at least a first segment and a second segment, the first segment having a first sealing surface in contact with an end face of the vehicle window pane and the second segment having a second sealing surface configured to be placed against the cover part such that the sealing element forms a seal between the vehicle window pane and the cover part, the second segment being moveable relative to the first segment,
    wherein the sealing element has a free space into which at least one of the segments is deformable, and wherein the free space is delimited by a groove that is open away from an outer surface of the sealing element.

10. The profile element assembly according to claim 9, wherein the profile element is connected to the cover part by the second connecting area, and wherein the second sealing surface is in contact with a counter-surface of the cover part.

11. A profile element for connecting a vehicle window pane to a cover part, the profile element comprising:
a first connecting area for connecting the profile element to the vehicle window pane;
a second connecting area for connecting the profile element to the cover part; and
a sealing element having at least a first segment and a second segment that are moveable relative to each other, the first segment having a first sealing surface configured to be placed against the vehicle window pane and the second segment having a second sealing surface configured to be placed against the cover part such that the sealing element forms a seal between the vehicle window pane and the cover part,
wherein the sealing element has an outer surface that, in a mounted state of the profile element, is arranged so as to be essentially flush with an outside of the vehicle window pane and with an outside of the cover part, and
wherein the segments are arranged on a side of the sealing element facing away from an outer surface of the sealing element.

12. The profile element according to claim 11, wherein the segments are produced in one piece with each other.

13. The profile element according to claim 11, wherein the segments are connected to each other by a connecting section that has a tapered cross section.

14. The profile element according to claim 11, wherein the sealing element has a free space into which at least one of the segments is deformable.

15. The profile element according to claim 14, wherein the second segment of the sealing element is connected at a first end to the first segment and has a free end opposite the first end, an opening into the free space being located at the free end.

16. The profile element according to claim 11, wherein the sealing element is made of at least one resilient material, so that, by means of an application of an external force, the segments are moved relative to each other from a relaxed initial state into an intermediate state, and so that, from the intermediate state, the segments are autonomously restored back in a direction of their initial state due to restoring forces of the resilient material.

17. The profile element according to claim 11, wherein the second connecting area has a latching area that accommodates a latching member of the cover part, and wherein, within the latching area, a latching element is disposed and configured to latch the latching member in the latching area, the latching element extending along a latching element plane that is oriented at an acute angle relative to an insertion plane for inserting the latching member into the latching area, so that the latching element forms a barb.

18. A profile element assembly, comprising:
a profile element comprising:
a first connecting area connected to a vehicle window pane;
a second connecting area for connecting the profile element to a cover part; and
a sealing element having at least a first segment and a second segment, the first segment having a first sealing surface in contact with an end face of the vehicle window pane and the second segment having a second sealing surface configured to be placed against the cover part such that the sealing element forms a seal between the vehicle window pane and the cover part, the second segment being moveable relative to the first segment,
wherein the sealing element has an outer surface that, in a mounted state of the profile element, is arranged so as to be essentially flush with an outside of the vehicle window pane and with an outside of the cover part, and
wherein the segments are arranged on a side of the sealing element facing away from an outer surface of the sealing element.

19. The profile element assembly according to claim 18, wherein the profile element is connected to the cover part by the second connecting area, and wherein the second sealing surface is in contact with a counter-surface of the cover part.

* * * * *